US007391785B2

(12) United States Patent
Chang et al.

(10) Patent No.: US 7,391,785 B2
(45) Date of Patent: Jun. 24, 2008

(54) METHOD FOR ACTIVE QUEUE MANAGEMENT WITH ASYMMETRIC CONGESTION CONTROL

(75) Inventors: Chih-Jen Chang, Apex, NC (US); Whay Chiou Lee, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 1052 days.

(21) Appl. No.: 10/233,989

(22) Filed: Sep. 2, 2002

(65) Prior Publication Data
US 2004/0042397 A1 Mar. 4, 2004

(51) Int. Cl.
*H04L 12/28* (2006.01)
(52) U.S. Cl. .................. 370/412; 370/230.1; 370/235
(58) Field of Classification Search .............. 370/412, 370/232–235, 229–231, 428–429, 401, 413; 709/235
See application file for complete search history.

(56) References Cited

U.S. PATENT DOCUMENTS

| 5,426,640 A | * | 6/1995 | Hluchyj et al. | ............... 370/235 |
| 6,690,645 B1 | * | 2/2004 | Aweya et al. | ............... 370/230 |

OTHER PUBLICATIONS

Feng, Wu-chang, Kandlur, Dilip D., Saha, Debanjan, and Shin, Kang G., "BLUE: A New Class of Active Queue Management Algorithms", University of Michigan, IBM T.J. Watson Research Center, undated, 27 pp.
Ott, Teunis J., Lakshman, T.V., and Wong, Larry, "SRED: Stabilized RED", Bellcore, Bell Laboratory, undated, 10 pp.
Lin, Dong and Morris, Robert, "Dynamics of Random Early Detection," Harvard University, Revised version of the paper that appeared in the Proceedings of SIGCOMM'97, undated, 11 pages.
"Weighted Random Early Detection on the Cisco 12000 Series Router", undated, 28 pp.
Floyd, Sally and Jacobson, Van, "Random Early Detection Gateways for Congestion Avoidance," Lawrence Berkeley Laboratory, University of California, IEEE/ACM Transactions on Networking, Aug. 1993, 22 pp.
Braden, B. et al., "Recommendations on Queue Management and Congestion Avoidance in the Internet", The Internet Society, RFC 2309, Apr. 1998, 17 pp.
Clark, David D. and Fang, Wenjia, "Explicit Allocation of Best-Effort Packet Delivery Service," IEEE/ACM Transactions on Networking, vol. 6, No. 4, Aug. 1998, pp. 362-373.
Anjum, Farooq M. and Tassiulas, Leandros, "Balanced-RED: An Algorithm to Achieve Fairness in the Internet", Technical Research Report CSHCN T.R. 99-9 (ISR T.R. 99-17), Mar. 8, 1999, 30 pp.
Allman, M. et al., "TCP Congestion Control", The Internet Society, RFC 2581, Apr. 1999, 14 pp.
Pan, Rong, Prabhakar, Balaji, and Psounis, Konstantinos, "CHOKe A Stateless Active Queue Management Scheme For Approximating Fair Bandwidth Allocation", Stanford University, Jun. 12, 1999, 20 pp.
Jacobson, V., Nichols, K., and Poduri, K., "RED in a Different Light," Cisco Systems, Draft of Sep. 30, 1999, 38 pp.

* cited by examiner

*Primary Examiner*—Ricky Ngo
*Assistant Examiner*—DeWanda Samuel

(57) ABSTRACT

A scalable method for efficient dynamic allocation of buffer resources in a store-and-forward device, such that high utilization can be maintained with small average buffer occupancy by providing asymmetric congestion control with opportune random detection. Also provided is tolerance of transient onset of congestion and fairness toward bursty traffic with ready reaction to declines in congestion.

11 Claims, 5 Drawing Sheets

METHOD FOR ACTIVE QUEUE MANAGEMENT WITH ASYMMETRIC CONGESTION CONTROL

FIELD OF THE INVENTION

The present invention relates generally to congestion avoidance and control of data packet flows and, more particularly, to efficient dynamic allocation of buffer resources in a store-and-forward device, wherein said allocation distinguishes between congestion onset and decline.

BACKGROUND OF THE INVENTION

Congestion in a network link occurs whenever the amount of offered traffic exceeds its capacity. Buffering resources are often used to accommodate the transient excess traffic and to preserve reasonable utilization of the communication link. Buffering resources in a store-and-forward device, such as a packet switch or router, are typically structured as one or more queues. When there is transient overload due to bursty traffic, a queue could be filled up to its maximum queue length and incoming packets could be subject to a large queuing delay. In addition, the chance that several consecutive packets are dropped due to buffer overflow is high.

Several passive queue management (PQM) approaches have been attempted or proposed to better manage congestion problems in the queues of store-and-forward devices. Unfortunately, in most PQM approaches, such as tail drop, LQD (Longest Queue Drop) and RND (Dynamic Soft Partitioning with Random Drop), bursty flows result in inefficient handling of flows because of the reactive nature of PQM.

In contrast, active queue management (AQM) is a proactive approach to queue management, wherein packets may be dropped before a queue becomes full to avoid congestion. Existing AQM schemes, such as RED (Random Early Detection) and its variations, SRED (Stabilized RED) and CHOKe (CHOose to Keep for responsive flows, CHOose to Kill for non-responsive flows) and BLUE are typically designed to respond early, yet gradually, with onset of congestion, so that packet marking/dropping is not concentrated on a burst of consecutive arrivals, either from a single source or a plurality of sources. This is intended to enhance fairness to bursty traffic as well as to minimize the chance of synchronizing the reaction of responsive flows, such as TCP (Transmission Control Protocol) flows. Unfortunately, these schemes tend to be sluggish upon decline of congestion. As a result, there is unnecessary marking/dropping of packets in the event of congestion decline, and throughput is accordingly limited.

Few existing AQM schemes have been designed for managing per-flow queues to provide isolation among flows so that misbehaving flows may be identified and be subject to punitive measures. Existing AQM schemes that have been originally designed for managing aggregate queues may be used to support per-flow queue management, but are not scalable enough to support systems with a large number of flows. Some that have been designed for managing per-flow queues are also not scalable because they tend to require excessive memory and computation overhead, while others are not very effective in avoiding marking/dropping of consecutive arrivals because there is not sufficient hysteresis in their packet marking/dropping mechanisms.

DETAILED DESCRIPTION OF THE INVENTION

In accordance with the present invention, there is provided a method for efficient dynamic allocation of buffer resources in a store-and-forward device, such that high utilization can be maintained with small average buffer occupancy. The present invention, which addresses some of the open issues associated with RED, provides asymmetric congestion control with opportune random detection (ACCORD). Advantageously, not only are most of the desirable features of existing AQM schemes retained, including tolerance of transient onset of congestion and fairness toward bursty traffic, but the method also reacts readily to congestion decline. In addition, the method, as described below, is considerably more scalable than most of the existing per-flow AQM schemes.

The present invention makes use of a flexible framework to statistically control hysteresis and to identify persistent queues in the system. The framework consists of a plurality of states, each associated with an increasing marking/dropping probability. The transitions between states are contingent upon predetermined congestion conditions, and take effect randomly based on predetermined probabilities. With probabilistic marking/dropping of packets prior to buffer overflow, which is a key feature of AQM, the invention can thus tolerate transient onset of congestion and is fair toward bursty traffic.

Greater scalability is possible because there is no run-time computation of marking/dropping probabilities, and the congestion metrics used are derived straightforwardly from instantaneous queue lengths, i.e., without incurring the overhead for determining average queue lengths. In addition, there is provided configurable control parameters for implementing asymmetric responses to onset and decline of congestion, so that system throughput is enhanced due to rapid recovery from the random marking/dropping mode when congestion declines. A particular advantage of the present invention is the ability of different sets of configurable control parameters to be implemented for different types of flows. Thus, flows with different degrees of misbehavior may be subject to different levels of punitive measures.

Figure 1:
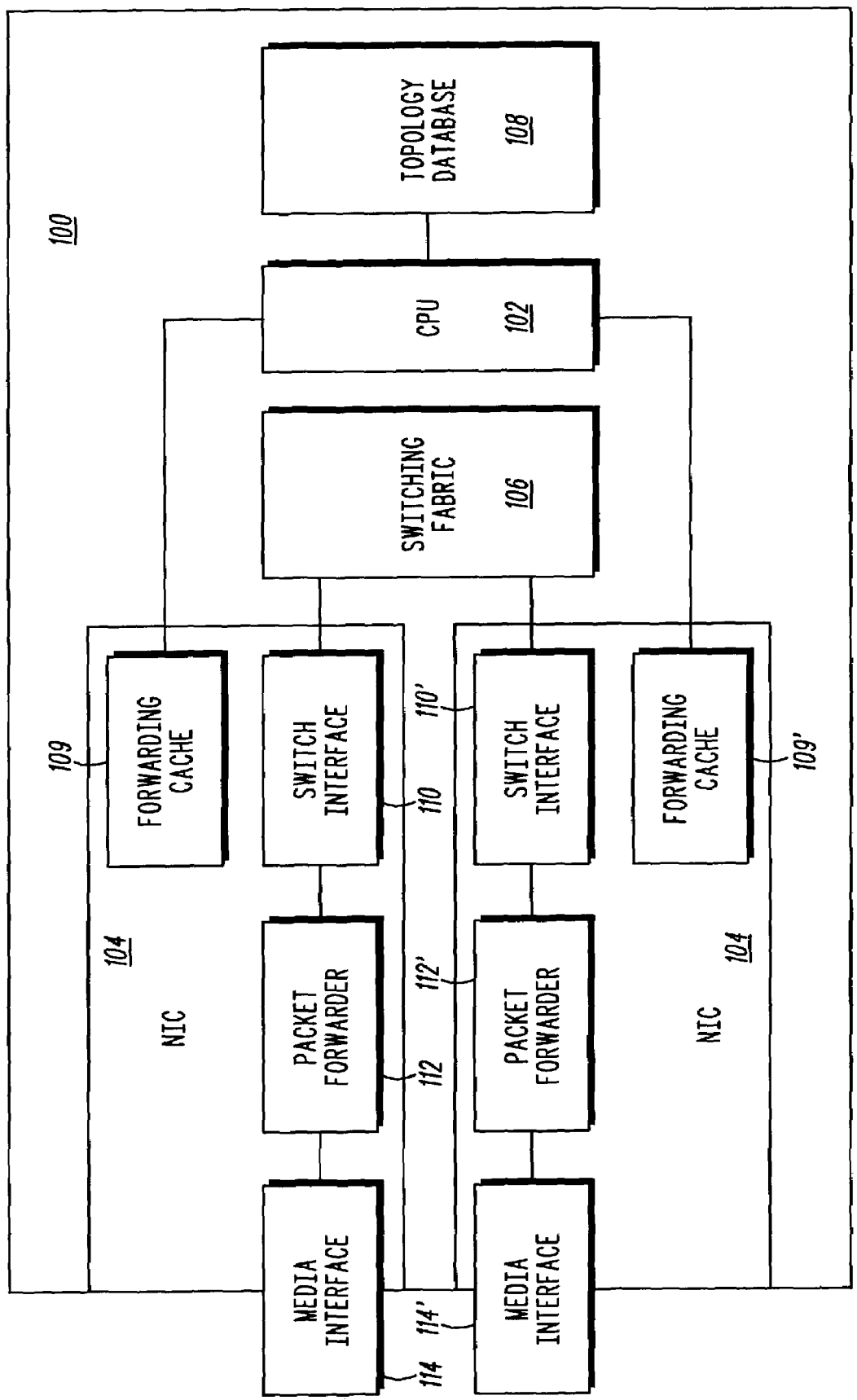
FIG. 1 comprises a block diagram in accordance with various embodiments of the invention.

Referring to FIG. 1, an exemplary router 100 incorporating the active queue management system in accordance with the present invention is shown. The router 100 includes one or more network interface cards (NICs) 104, 104' and a hardware packet switch 106 for connecting the interface cards. A routing topology database 108 for storing state information about other routers and links that interconnect them on the network is in communication with a processor 102. The network interface cards 104, 104' include packet switch interfaces 110, 110', packet forwarders 112, 112' and media interfaces 114, 114' for sending and receiving data packets. Each of the network interface cards 104, 104' also include forwarding caches 109, 109', also connected to the processor 102, for identifying the next hop in the network each data packet should be routed. The processor 102 is responsible for handling the data queue and controlling congestion, including related computations as described below.

At any time, a data queue in the router is considered to be in one of a predetermined number of states, each associated with a different marking/dropping probability between 0 and 1, inclusive. The queue is initially in a non-marking/non-dropping state (i.e., a state associated with a marking/dropping probability of value zero). When the queue is first detected to be experiencing congestion, it is probabilistically moved to a state of the next higher marking/dropping probability. If this condition persists, the queue successively drifts towards the state with a marking/dropping probability of value one. Whenever the congestion condition goes away, the queue is readily moved back to the non-marking/non-dropping state.

In accordance with the present invention, there are J ordered states from state 0 through state J−1, wherein J>1. In an exemplary embodiment of the present invention, J=4. Each successive state is associated with a probability of marking/dropping higher than that of its previous state. The transition from one state to another is based on the validity of a predetermined congestion condition based on instantaneous queue length and a predetermined transition probability that is associated with the predetermined congestion condition. Specifically, the transition probability when the queue length is Q is denoted $P_x(Q)$, wherein $$P_x(Q) = \begin{cases} P_{x\_min} & \text{if } \min_{th} \leq Q < med_{th} \\ P_{x\_med} & \text{if } med_{th} \leq Q < \max_{th} \\ P_{x\_max} & \text{if } \max_{th} \leq Q \end{cases}$$

where $0 < P_{x\_min} < P_{x\_med} < P_{x\_max} < 1$.

By choosing appropriate values for the transition probabilities, a desired level of hysteresis is imposed on the movement of the queue to successive states of higher marking/dropping probabilities. Therefore, different levels of congestion can be treated with different marking/dropping policies. Persistent bursts of a flow are subject to increasing marking/dropping probabilities as the flow drifts readily to successive states of higher marking/dropping probabilities, whereas occasional bursts of a flow are only subject to low marking/dropping probabilities as the flow drifts rather slowly to the successive states of higher marking/dropping probabilities.

The current state of a queue is defined by an integer S that falls between 0 and J−1 inclusive, i.e. $S \in \{0, 1, 2, \ldots, J-1\}$. $P_a(S)$, the marking/dropping probabilities associated with each state S is configurable for $0 < S \leq J-1$, such that $P_a(S+1) > P_a(S)$ and $P_a(0)=0$, $P_a(J-1)=1$. In one embodiment of the invention, $P_a(S)$ may also be generated by the following default formula for $0 < S \leq J-1$: $P_a(S) = \theta^{J-S-1}$, where $0 < \theta < 1$, where preferably $\theta = 0.1$.

Figure 2:
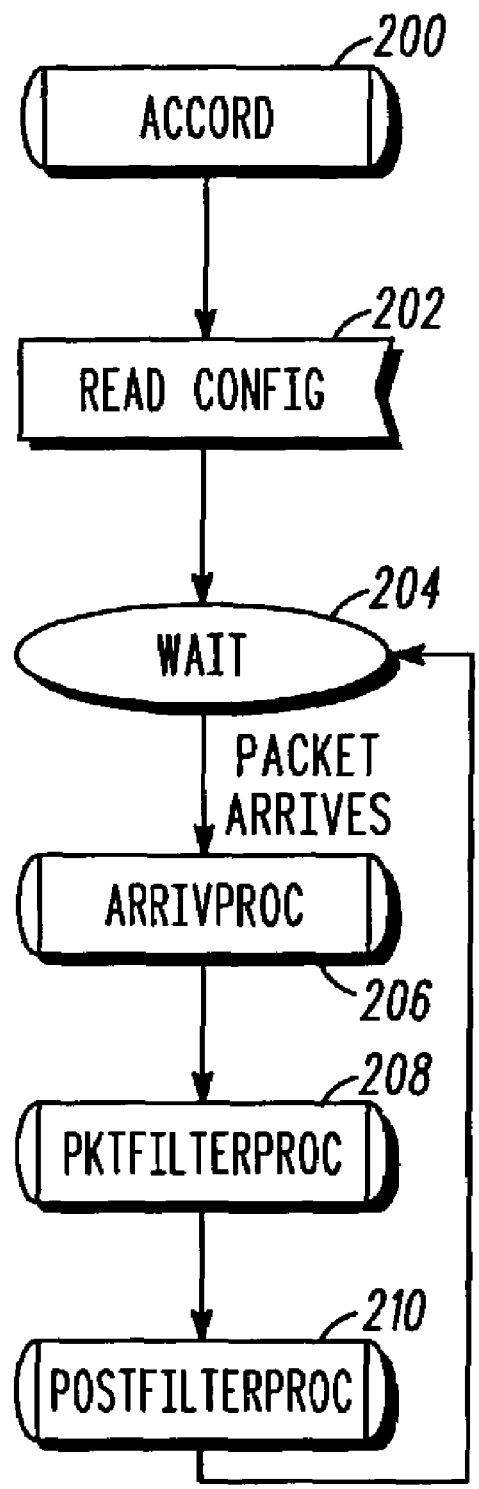
FIG. 2 comprises a flow diagram in accordance with various embodiments of the invention.

Referring to FIG. 2, the present invention is shown in operation. In step 200, the router begins execution of the main subroutine. In step 202, the ACCORD system initializes by loading a configuration file and waits in step 204 for the arrival of the next data packet into the router. The system in step 206 executes a subroutine, which in step 300 (FIG. 3) begins processing the packet.

Figure 3:
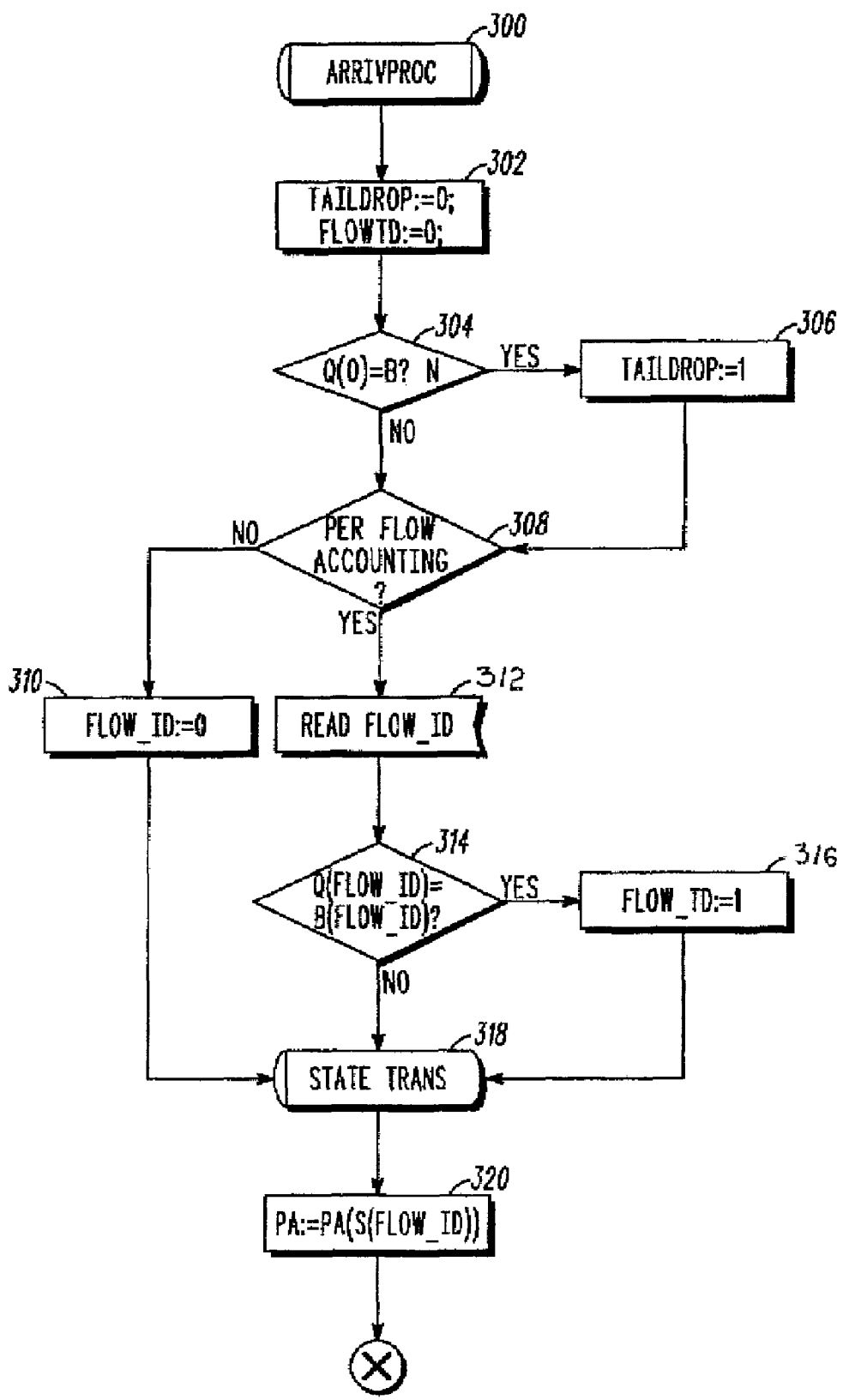
FIG. 3 comprises a flow diagram in accordance with various embodiments of the invention.

Referring to FIG. 3, a flag (TailDrop) is set to zero to indicate that there is no aggregate buffer overflow. Another flag (FlowTD) is set to zero to indicate that there is no per-flow buffer overflow. In step 304, the instantaneous queue length is examined to determine whether it has reached its capacity, which is denoted B. If capacity has been reached, then the Taildrop flag is set to 1 to indicate that aggregate buffer overflow has occurred.

The system then moves onto step 308 and determines whether per flow accounting is active for tracking each different data flow. If not, the system sets a $flow_{13}$ ID variable of zero at step 310 and continues onto step 318. Otherwise, in step 312, the $flow_{13}$ ID for the particular flow being processed is determined. The system checks in step 314 whether the instantaneous queue length for the processed flow equals the queue capacity for the same processed flow. If so, then the FlowTD flag is set to 1 at step 316 to indicate that per-flow buffer overflow has occurred. Processing then continues to the state transition subroutine in step 318, which in step 400 (FIG. 4) begins the process of assigning a new state value to the packet.

Figure 4:
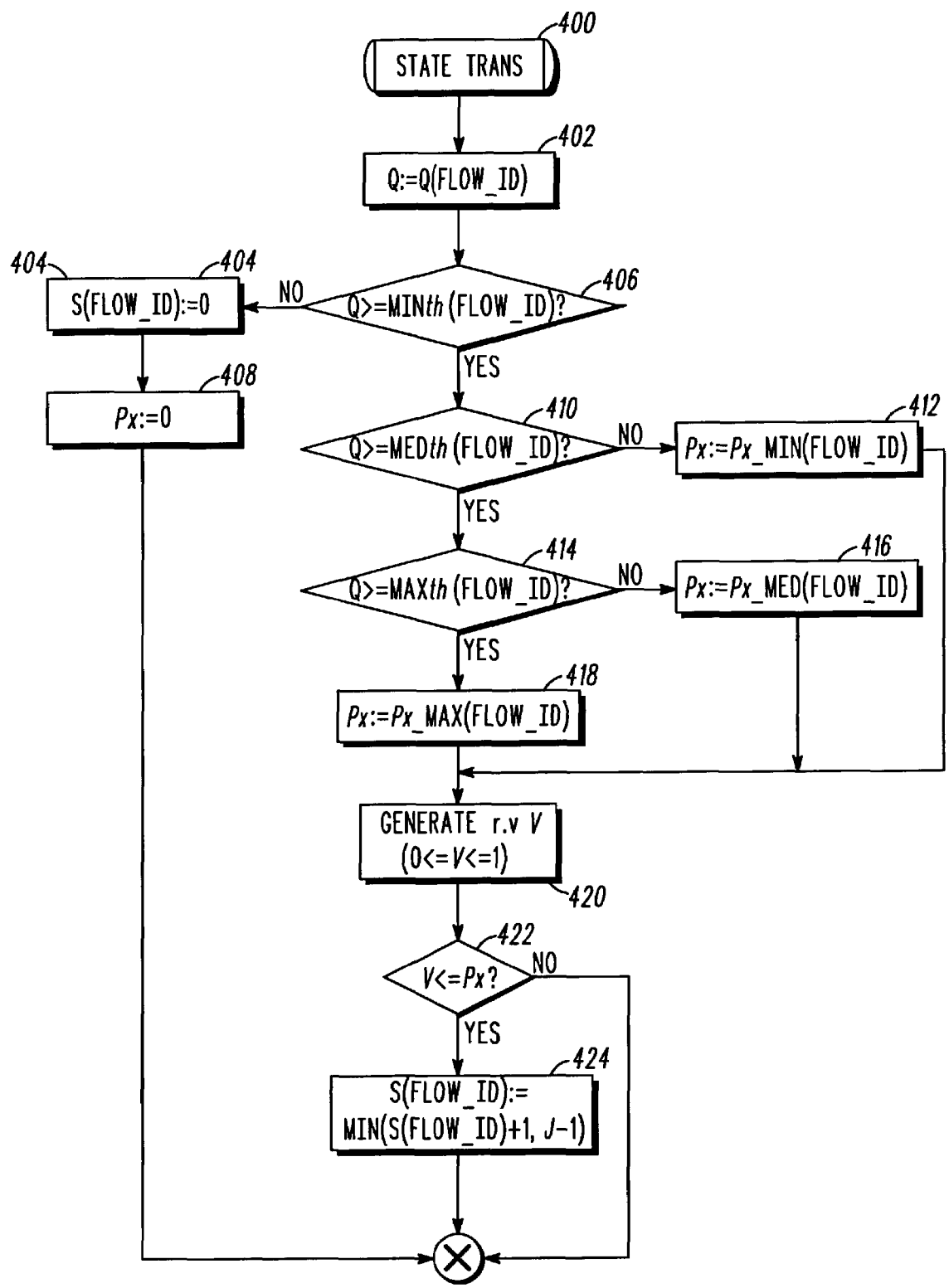
FIG. 4 comprises a flow diagram in accordance with various embodiments of the invention.

Referring to FIG. 4, instantaneous queue length is equated to instantaneous queue length of the present flow. Subsequently, the instantaneous queue length is run through a sorting process to determine the level of congestion. In particular, in step 406, it is determined whether the instantaneous queue length is greater than or equal to a minimum congestion threshold, which, for example, maybe one-fourth of the buffer capacity. If not, then in steps 404 and 408 both the current state of the queue and the packet marking/dropping probability is set to zero and processing continues to step 320 (FIG. 3). In step 410 it is determined whether the queue length is greater than or equal to the medium congestion threshold, which is, for example, one-half the buffer capacity. If not, then in step 412 the packet marking/dropping probability value is set to a minimum state transition probability, which maybe, for example, 0.0625. It is to be noted that the inverse of all state transition probability values reflect the expected duration that a queue is allowed to stay in the current state. Processing then continues to step 420.

If in step 410 it is determined that the queue length is greater than or equal to the medium congestion threshold, then processing continues to step 414 where it is determined whether the queue length is greater than or equal to the maximum congestion threshold, which is, for example, three-fourths the buffer capacity. If not, then in step 416 the packet marking/dropping probability value is set to a medium state transition probability, which maybe, for example, 0.125. Otherwise, if the queue length is greater than or equal to the maximum congestion threshold, then in step 418 the packet marking/dropping probability value is set to a maximum state transition probability, which maybe, for example, 0.25. Processing then continues to step 420.

In step 420, a random variable V is generated, such that the random variable has a value that falls in a range between 0 and 1 inclusive. In step 422 it is determined whether the random variable is less than or equal to the determined state transition probability. If so, then the current state of the queue being processed is incremented by 1 provided that it results in a valid state. If such incremented state exceeds J−1, which is the maximum permissible value of a state, the current state of the queue is unchanged. Otherwise, if the random variable is greater than the determined state transition probability, processing continues to step 320 (FIG. 3). Referring to FIG. 3, in step 320, the packet marking/dropping probability is set to the value determined in the state assignment subroutine (as described above) and processing then continues to step 208 (FIG. 2) for execution of a packet filtering subroutine in step 500 (FIG. 5).

Figure 5:
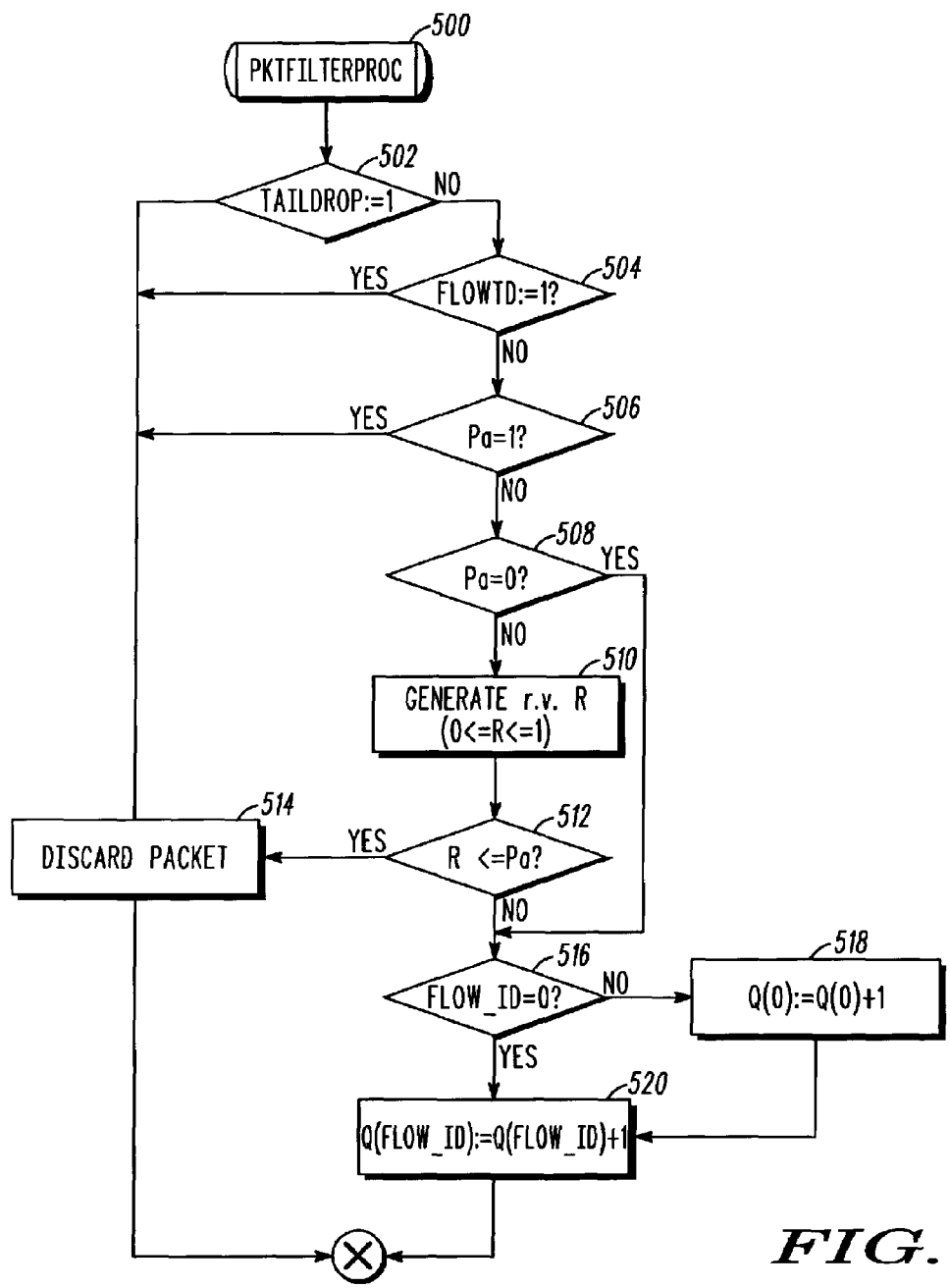
FIG. 5 comprises a flow diagram in accordance with various embodiments of the invention.

Referring to FIG. 5, in step 502, it is determined whether the aggregate buffer has overflowed (TailDrop=1). If so, then the packet is discarded in step 514 and the subroutine is exited. Otherwise, it is determined whether the per-flow buffer overflow has occurred. If so, this also results in the packet being discarded in step 514 and ending of the subroutine. Otherwise, it is determined whether the packet marking/dropping probability is set to 1. If so, this also results in the packet being discarded in step 514 and ending of the subroutine. Otherwise, it is determined whether the packet marking/dropping probability is set to 0. If so, the flow_ID for the processed flow is determined, in step 516, whether it is set to zero. Otherwise, in step 510, a random variable R is generated, such that the random variable has a value that falls in a range between 0 and 1 inclusive. In step 512 it is determined whether the random variable is less than or equal to the determined packet marking/dropping probability. If so, then the packet is discarded in step 514 and the subroutine is exited. Otherwise, in step 516 it is determined whether the flow_ID for the particular flow is set to zero. If not, then the instantaneous queue length is incremented by one in step 518 to indicate that the packet is admitted to the queue. Processing then continues to step 520 where the instantaneous queue length associated with the particular flow identified by flow_ID is incremented by one to indicate that the packet is admitted to the per-flow queue associated with the particular flow. The subroutine is then exited and processing returns to step 210 (FIG. 2) for execution of the post filtering process in step 600 (FIG. 6).

Figure 6:
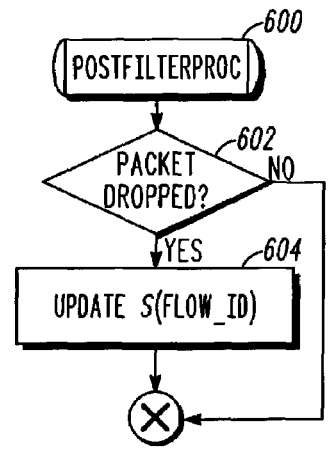
FIG. 6 comprises a flow diagram in accordance with various embodiments of the invention.

Turning now to FIG. 6, it is determined in step 602 whether the packet was dropped. If so, then the current state of the queue for the particular flow is updated in step 604. Otherwise, no update takes place. Processing then returns to step 204 where the system again waits for the arrival of the next packet.

While the invention has been particularly shown and described with reference to a particular embodiment, it will be understood by those skilled in the art that various changes in form and details may be made therein without departing from the spirit and scope of the invention, and it is intended that such changes come within the scope of the following claims.

What is claimed is:

1. A method in a store and forward device for actively managing a data queue in a buffer having one or more data packets, the method comprising the steps of:
    assigning the data queue an initial state;
    discarding an incoming data packet if the data queue is currently full;
    determining a level of congestion currently experienced by the data queue if the data queue is not full;
    reassigning the data queue to one of a plurality of states based on the determined level of congestion and the current state of the data queue, wherein the plurality of states comprise a series of successive states that are each associated with a different probability of dropping an incoming packet that is higher than that of a previous state and that are not derived from a length of the data queue;
    deciding whether to discard the incoming data packet based on the current state of the data queue;
    reassigning the data queue to one of a plurality of states based on the determined level of congestion and the current state of the data queue if the incoming data packet is discarded; and
    upon arrival of another data packet, recycling back to determining a level of congestion currently experienced by the data queue.

2. The method of claim 1 wherein the initial state is designated a non-dropping state wherein the incoming data packet is allowed to enter the data queue without dropping if the data queue is currently in the initial state.

3. The method of claim 1 wherein the incoming data packet is discarded probabilistically in accordance with the probability of dropping an incoming packet associated with the current state of the data queue, unless the current state of the data queue is the initial state.

4. The method of claim 3 wherein the data queue is reassigned to the initial state if the incoming data packet is discarded.

5. The method of claim 1 wherein the step of determining a level of congestion in the data queue is based on a measure of instantaneous queue length.

6. The method of claim 4 wherein the step of reassigning the data queue to one of a plurality of states based on the determined level of congestion and the current state of the data queue further comprising the steps of:
    assigning a probability to each possible transition from the current state to a next state based on the validity of a predetermined congestion condition; and
    making a transition from the current state to the next state probabilistically in accordance with the assigned probability.

7. A method in a store and forward device for actively managing a data queue in a buffer having one or more data packets, the method comprising:
    assigning the data queue an initial state;
    discarding an incoming data packet if the data queue is currently full;
    determining a level of congestion currently experienced by the data queue if the data queue is not full;
    probabilistically reassigning the data queue to one of a plurality of states based on the determined level of congestion, wherein the plurality of states comprise a series of successive states associated with a probability of marking an incoming packet higher than that of a previous state;
    deciding whether to mark the incoming data packet based on the current state of the data queue, wherein the marking of the incoming data packet is used for explicit congestion notification to the source of the data packet;
    reassigning the data queue from the current state to the initial state if the incoming data packet is marked or discarded; and
    upon arrival of another data packet, recycling back to determining a level of congestion currently experienced by the data queue.

8. The method of claim 7 wherein the initial state is designated a non-marking state wherein the incoming data packet is allowed to enter the data queue without marking if the data queue is currently in the initial state.

9. The method of claim 8 wherein the incoming data packet is marked probabilistically in accordance with the probability of marking an incoming packet associated with the current state of the data queue, unless the current state of the data queue is the initial state.

10. The method of claim 7 wherein the step of determining a level of congestion in the data queue is based on a measure of instantaneous queue length.

11. The method of claim 10 wherein the step of probabilistically reassigning the data queue to one of a plurality of states based on the determined level of congestion further comprises the steps of:
    assigning a probability to each possible transition from the current state to a next state based on the validity of a predetermined congestion condition; and
    making a transition from the current state to the next state probabilistically in accordance with the assigned probability.

* * * * *

UNITED STATES PATENT AND TRADEMARK OFFICE
CERTIFICATE OF CORRECTION

PATENT NO. : 7,391,785 B2     Page 1 of 1
APPLICATION NO. : 10/233989
DATED : June 24, 2008
INVENTOR(S) : Chih-Jen Chang et al.

It is certified that error appears in the above-identified patent and that said Letters Patent is hereby corrected as shown below:

In Column 4, Line 1, delete "flow13 ID" and insert -- flow_ID --, therefor.

In Column 4, Line 3, delete "flow13 ID" and insert -- flow_ID --, therefor.

Signed and Sealed this

Fourteenth Day of July, 2009

JOHN DOLL
*Acting Director of the United States Patent and Trademark Office*